United States Patent [19]

Quirk et al.

[11] Patent Number: 4,911,678
[45] Date of Patent: Mar. 27, 1990

[54] LABYRINTH SEAL COUPLING

[75] Inventors: Michael J. Quirk, Westfield, N.Y.; Edward E. Allen, North East, Pa.

[73] Assignee: Renold, Inc., Westfield, N.Y.

[21] Appl. No.: 221,431

[22] Filed: Jul. 19, 1988

[51] Int. Cl.⁴ .............................................. F16D 3/18
[52] U.S. Cl. ...................................... 464/154; 464/159
[58] Field of Search ................. 464/154, 158, 159, 16; 277/181, 182, 183

[56] References Cited

U.S. PATENT DOCUMENTS

| | | | |
|---|---|---|---|
| 1,356,860 | 10/1920 | Fast | 464/154 |
| 2,201,799 | 5/1940 | Serrell et al. | 464/154 X |
| 2,271,060 | 1/1942 | Case | 464/154 |
| 2,286,444 | 6/1942 | Smith | 464/154 |
| 2,565,770 | 8/1951 | Johnson | 464/158 X |
| 2,986,908 | 6/1961 | Wilkerson | 464/154 |
| 3,003,338 | 10/1961 | Wong | 464/159 X |
| 3,712,080 | 1/1973 | Shigeura | 464/154 |
| 3,953,986 | 5/1976 | Calistrat | 464/154 |
| 4,789,376 | 12/1988 | Grant | 464/154 |

FOREIGN PATENT DOCUMENTS

| | | | |
|---|---|---|---|
| 398780 | 9/1973 | U.S.S.R. | 464/154 |
| 2016648 | 9/1979 | United Kingdom | 464/154 |

Primary Examiner—Daniel P. Stodola
Attorney, Agent, or Firm—Charles Lovercheck; Wayne L. Lovercheck; Dale R. Lovercheck

[57] ABSTRACT

A coupling including a seal which has an outer periphery that is adapted to be pressed into the inner periphery of a hollow cylindrical sleeve of a gear coupling. An annular flange is integrally attached to the ring and the flange extends radially inwardly and toward and is adapted to underlie the external teeth on the hub of the coupling. The flange terminates in an inwardly directed sealing surface that is adapted to sealingly engage an external cylindrical surface on the hub. The sealing surface on the flange is adapted to be disposed on a plane passing through the center of curvature of the tips of the hub teeth perpendicular to the central axis of the coupling.

3 Claims, 2 Drawing Sheets

LABYRINTH SEAL COUPLING

BACKGROUND OF THE INVENTION

This invention relates to a labyrinth seal for flexible couplings for connecting a drive shaft to a driven shaft The seal may be made of metal or suitable non-metallic material.

REFERENCE TO PRIOR ART

The art of gear type couplings and seals for use in these couplings is well developed but there has been a long standing need for a fluid tight seal in a gear type coupling which is simple in construction and efficient in operation and economical to manufacture nd durable and long lasting.

Applicant is aware of the following patents:

U.S. Pat. No. 2,766,864 to Schilling et al shows a fluid operated torque responsive clutch device with a flexible type seal made up of an expansible ring indicated at 32.

The well known labyrinth seal is another type of seal that is well known in the art.

The celebrated O-ring seal is another optional seal used in couplings.

U.S. Pat. No. 3,094,335 to Shenk shows a "rising ring" seal in a coupling which allows the sealing ring to move with the shaft as the shaft moves radially during misalignment operation.

Original U.S. Pat. No. 2,201,799, (Re. 21,843) to Smith et al shows a seal that is located on a radial line of the tooth in a gear coupling which engages the shaft over a substantially great length.

U.S. Pat. No. 3,627,355 to Reddy shows a fluidtight swivel joint which utilizes a fluidtight sealing joint having a rotatable rotor mounted in a bore in a body.

GENERAL STATEMENT OF INVENTION

A gear type coupling according to the invention is made up generally of a hollow cylindrical sleeve body with two circular rows of internal teeth in the sleeve. Two hubs having external barrel shaped teeth are provided and a drive shaft may be connected to one hub and a driven shaft is connected to the other hub. The hubs are received in opposite ends of the sleeve. Teeth on the hubs engage the internal teeth on the sleeve. These couplings are sometimes lubricated with liquid lubricant under pressure and seals must be provided between the ends of the sleeve and the outer periphery of the hubs to prevent escape of lubricant. Various designs of seals have been proposed but no seal has been entirely satisfactory.

The present seal ring may be made of a metallic sealing material or other suitable non-metallic material. It may make contact with the sea surface of the hub during misalignment operation. The sealing ring is pressed into an end of a coupling sleeve. The seal is located on a plane passing through a radius of curvature of the sphere defining the curved tips of the hub teeth so that there is minimum motion of the hub seal surface relative to the seal. This is accomplished by locating the tooth tip surface seal near the perpendicular radius of curvature of the hub tooth spherical crowned tip.

OBJECTS OF THE INVENTION

It is an object of the invention to provide a seal for couplings that is simple in construction, economical to manufacture and simple and efficient to use.

Another object of the invention is to provide a coupling, the design of which allows conversion from a basic O-ring seal coupling to a labyrinth seal coupling using the same sleeve ring gear.

Another object of the invention is to provide a labyrinth seal coupling made by passing a contoured seal ring from the internal direction to prevent loss of the seal during operation.

Another object of the invention is to provide a coupling made of steel or material having suitable qualities, which could also be made from other materials.

Another object of the invention is to provide a labyrinth in a seal that can be assembled with a press fit to create a positive seal.

Another object of the invention is to provide a labyrinth that can be assembled with a press fit with O-ring or similar material to create a positive seal.

Another object of the invention is to provide a labyrinth seal which can be assembled by a gluing in place with or without and O-ring or similar material to create a positive seal.

Another object of the invention is to provide a labyrinth seal which creates a large lubricant reservoir inside the coupling.

Another object of the invention is to provide a labyrinth seal that permits use of either oil or grease as a lubricant by creating a lubricant pocket.

Another object of the invention is to provide a two-piece labyrinth construction which permits heat treat of gear teeth for longer life when required.

Another object of the invention is to provide labyrinth type seal that can be designed to function as a means of piloting the floating coupling member for positive centering and dynamic balance.

Another object of the invention is to provide a labyrinth type construction seal which provides maximum strength by utilizing one-piece construction at the gear tooth area.

Another object of the invention is to provide a labyrinth type seal that is basically fail safe by means of unitized one-piece construction at the gear tooth area.

Another object of the invention is to provide a labyrinth type seal that permits heating of the hub gear for the interference assembly without damage to an O-ring or similar synthetic seal.

Another object of the invention is to provide a labyrinth ring which is locked in position by a flange.

Another object of the invention is to provide a labyrinth ring that can also be locked in position by dimpling.

Another object of the invention is to provide a labyrinth sealing ring that can be locked in position by a rolled over flange.

Another object of the invention is to provide a labyrinth ring in a seal which can be locked in position by welding.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF DRAWINGS

Figure 1:
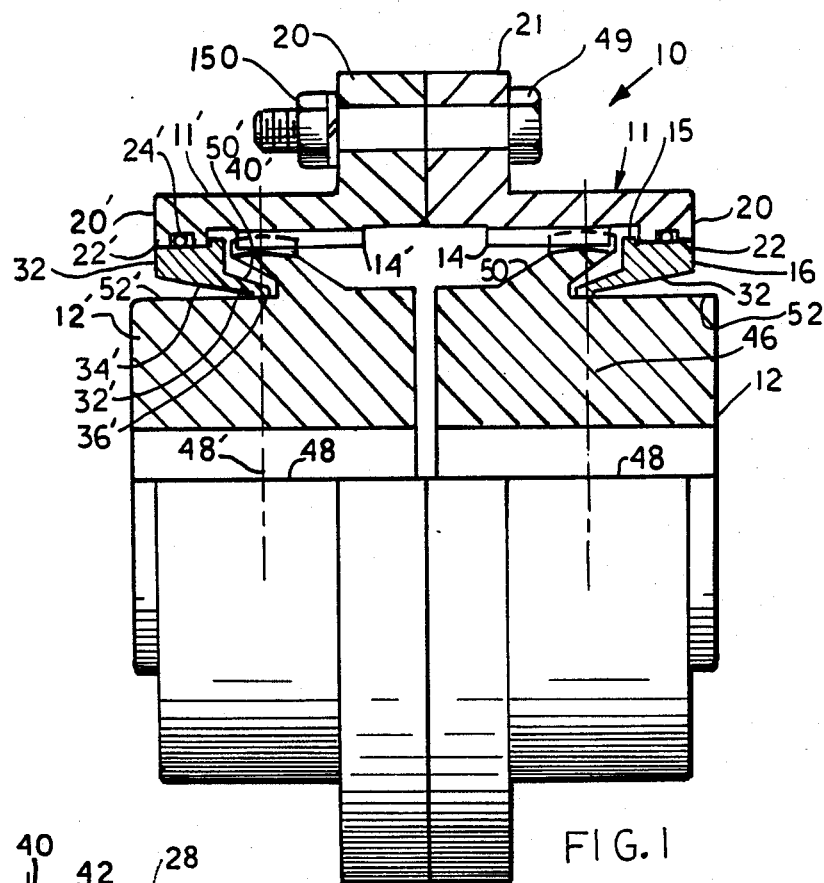
FIG. 1 is a half cross sectional view of a coupling according to the invention.

Now with more particular reference to the drawings, the coupling disclosed is made up of two identical halves wherein plain index numerals are used to identify parts on one half of the coupling and primed index numerals are used to identify corresponding parts on the other half of the coupling. Combination 10 is made up of two hollow sleeves 11 and 11', hubs 12 and 12' and seal rings 16 and 16'. Sleeves 11 and 11' have an internal, generally cylindrical surface, with internal teeth 14 and 14' integrally attached to the inner periphery of sleeves 11 and 11'. Sleeves 11, 11' may be identical and may be clamped together by bolts 49, having suitable nuts 150 or they may be attached by other well known attaching means.

Sealing rings 16 and 16' have a press-fit with and are pressed into sleeves 11 and 11'. Internal grooves 28 and 28' may be formed in surfaces 22 and 22' and "O" ring 24 may be received in groove 28. The outer periphery 34 of seal ring 16 is a press fit into internal surface 22 of flange 20 on sleeve 11. Stop flange 15 limits the movement of ring 16 into flange 20.

The cylindrical mating surfaces 22 and 34 between ring 16 and flanges 20 and 20' of sleeves 11 and 11' may be coated with a cement material; for example, a cement material such as that sold under the registered trademark "Loctite", which is familiar to those skilled in the art. Thus surfaces 34 and 34' of rings 16 and 16' are sealed to the inwardly directed surfaces 22 and 22' of flanges 20 and 20'. The seal may be used either with or without O-rings 24 and 24'.

Sealing rings 16 and 16' have inwardly and axially directed flanges 32 and 32' which terminate in inwardly facing cylindrical sealing surfaces 36 and 36'. External hub teeth 40 and 40' have spherical shaped tips which extend outwardly and engage the root surfaces of sleeves teeth 14 and 14' allowing hubs 12 and 12' to run in misalignment with sleeves 11. Flanges 32 and 32' underlie hub tooth support flanges 50 and 50'.

Hubs 12 and 12' have central bores for receiving a drive shaft and a driven shaft respectively. Hubs 12 and 12' also have cylindrical hub surfaces 52 and 52' for receiving sealing surface 36 of sealing rings 16 and 16'. Hub tooth support flange 50 provides a space between flanges 50 and 50' and cylindrical hub surfaces 52 and 52' to seal support flange 32.

Figure 4:
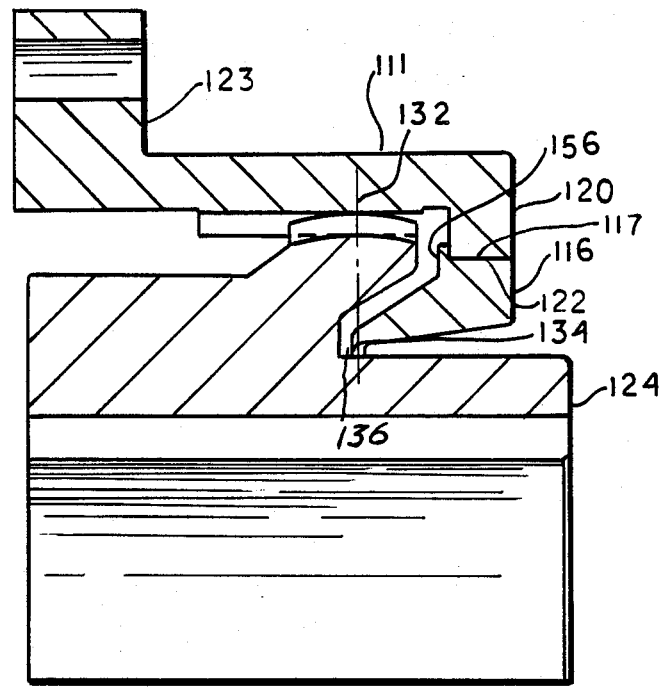
FIG. 4 is an enlarged partial view of another embodiment of the invention shown in FIG. 1.

In the embodiment of the invention shown in FIG. 4, sleeve 111 is shown supported on hub 124 with sealing ring 116 supported on the outer end of sleeve 111. The surface between the sealing ring 116 and flange 120 is a press fit with outwardly directed flange 120, which locates the sealing member 36 on sleeve 111 relative to the cylindrical surface 136 on ring 116.

Figure 2:
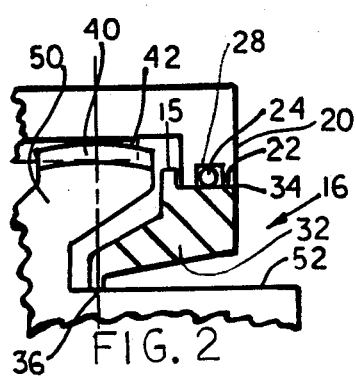
FIG. 2 is an enlarged partial view of the labyrinth seal according to the invention, shown in FIG. 1.
Figure 3:
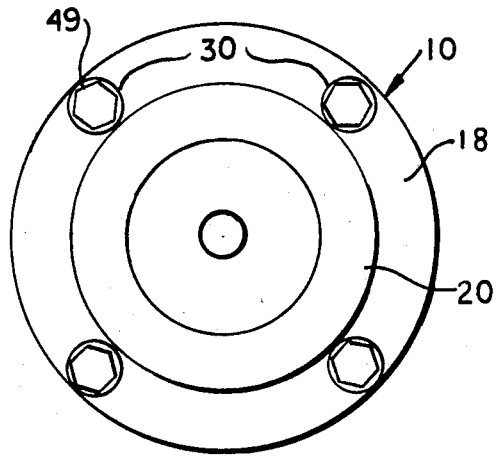
FIG. 3 is an end view of the coupling shown in FIG. 1.
Figure 5:
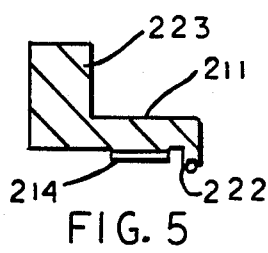
FIG. 5 is an enlarged partial view of a toothed sleeve another embodiment of the invention.
Figure 6:
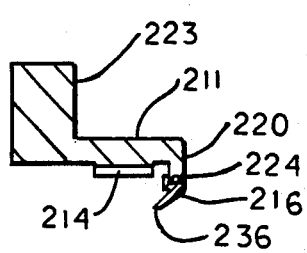
FIG. 6 is an enlarged partial view of the embodiment of the invention shown in FIG. 5.

In the embodiment of the invention shown in FIGS. 5 and 6, sleeve 211 has internal teeth 214 adapted to engage the teeth of a hub similar to hub 12 of FIG. 1. Sealing ring 216 has internal cylindrical surface ring pressed into flange 220. Sealing ring 216 may be made similar to ring 16 of FIGS. 1 and 2, and has inner sealing surface 236, which will engage the outer cylindrical surface of a hub. O-ring 224 is disposed in a groove in flange 220.

Figure 7:
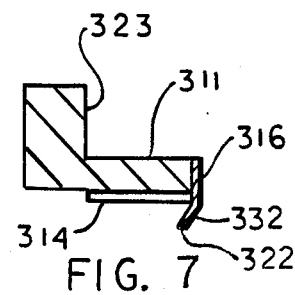
FIG. 7 is an enlarged partial view of the toothed sleeve.
Figure 8:
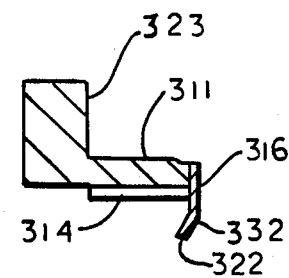
FIG. 8 is an enlarged partial view of the embodiment of the invention shown in FIG. 7.

In the embodiments of FIGS. 7 and 8, sleeve 311 with sealing ring 316 is shown. Rings 316 in FIGS. 5 and 6 may be a metal stamping welded or otherwise fixed to an end of a sleeve 211 and 311. Inner part 332 of ring 316 is inclined toward internal teeth 314 to engage hub surface 52 of the embodiment shown in FIG. 1. The seating surface 322 in FIG. 7 is generally parallel to the axis of the coupling. Inner peripheral edge 322 of ring 316 sealingly engages a cylindrical surface of a hub, similar to surface 52 in the hub 12 of FIG. 1. The surface 322 in FIG. 8 is deposed at an angle to the axis of the coupling.

The foregoing specification sets forth the invention in its preferred, practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. In combination a sealing ring, a misalignment gear type coupling having a hollow cylindrical sleeve and a hub, internal teeth on said sleeve, said hub having a first end and a second end, said hub being received in said sleeve, a tooth support member integrally attached to said hub and extending radially outwardly therefrom and toward said first end of said hub, external teeth on said tooth support member engaging said internal teeth on said sleeve, said external teeth on said tooth support member having outer tips curved to conform to a spherical surface having a center of curvature on a central axis of said hub, attaching means attaching said sealing ring to said sleeve, said attaching means comprising an external cylindrical seal surface on said sealing ring, an inwardly extending flange on said sleeve adjacent an end thereof, an internal sealing surface on said flange, said sealing ring having a press-fit between said sleeve and said cylindrical external surface on said sealing ring in engagement with said internal sealing surface on said sleeve, said sealing ring having a seal support member extending radially inwardly and axially and toward said second end of said hub and terminating in an annular internal cylindrical sealing surface, said hub having an external cylindrical hub surface extending toward said first end from said tooth support member and sealingly engaging said cylindrical sealing surface on said sealing ring, said sealing surface on said sealing ring being disposed on a line perpendicular to said hub axis and passing through said center of curvature of said spherical surface,
said sealing ring having a stop flange on the outer peripheral surface adjacent said internal teeth for limiting the movement of said sealing ring into said flange.

2. The combination recited in claim 1 wherein said inwardly directed flange has an internal groove formed therein and an "O" ring is disposed in said groove, said "O" ring sealingly engaging said cylindrical external surface on said sealing ring.

3. The combination recited in claim 1 wherein said seal support member has an internal surface.

* * * * *